(12) United States Patent
Huang et al.

(10) Patent No.: US 6,324,758 B1
(45) Date of Patent: Dec. 4, 2001

(54) METHOD FOR MAKING A CATALYTIC CONVERTER CANISTER

(75) Inventors: Hsin-Hong Huang, West Bloomfield; Gary Meyers, Farmington; Kenneth Mark Pickett, Monroe, all of MI (US)

(73) Assignee: Visteon Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/482,450

(22) Filed: Jan. 13, 2000

(51) Int. Cl.⁷ ............................................. B23P 15/00
(52) U.S. Cl. ................................. 29/890; 29/515
(58) Field of Search ....................... 29/890, 505, 515; 422/179, 180

(56) References Cited

U.S. PATENT DOCUMENTS

| | | |
|---|---|---|
| 2,222,762 | 11/1940 | Debor et al. . |
| 3,335,590 | 8/1967 | Early . |
| 3,978,567 | 9/1976 | Vroman . |
| 4,207,661 | 6/1980 | Mase et al. . |
| 4,360,957 | 11/1982 | Eng . |
| 4,969,264 | 11/1990 | Dryer et al. . |
| 5,385,873 | 1/1995 | MacNeill . |
| 5,701,737 | 12/1997 | Branik et al. . |
| 5,752,317 | 5/1998 | Keating et al. . |
| 5,829,132 | * 11/1998 | Sickels et al. ................... 29/515 |
| 5,909,916 | * 6/1999 | Foster et al. ..................... 29/890 |
| 5,943,771 | * 8/1999 | Schmitt ............................. 29/890 |
| 5,953,817 | 9/1999 | Watanabe et al. . |
| 6,000,131 | * 12/1999 | Schmitt ........................... 422/180 |
| 6,128,821 | * 10/2000 | Grescher ......................... 422/179 |
| 6,185,819 | * 2/2001 | Bauer et al. ..................... 29/890 |
| 6,185,820 | * 2/2001 | Foster .............................. 29/890 |

FOREIGN PATENT DOCUMENTS

4444759 A1   6/1996   (DE) .

OTHER PUBLICATIONS

British Patent Search Report Under Section 17 (5).

* cited by examiner

*Primary Examiner*—I Cuda Rosenbaum
(74) *Attorney, Agent, or Firm*—Visteon Global Tech., Inc.

(57) ABSTRACT

A method for making a relatively low profile catalytic converter canister 72, 80, 153 which is selectively and operatively deployed upon a vehicle 14 and which may be selectively used to form a catalytic converter assembly.

17 Claims, 5 Drawing Sheets

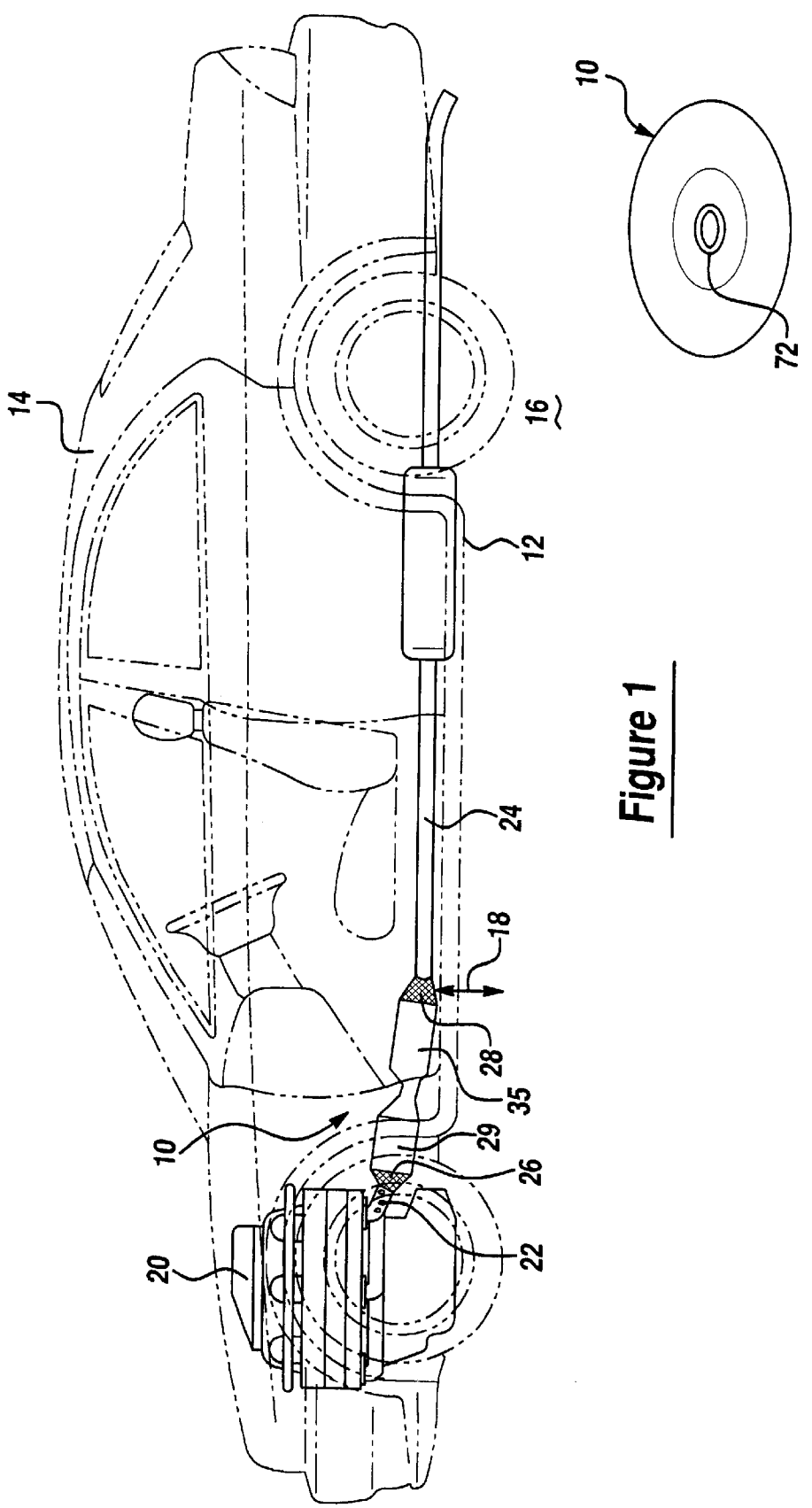

METHOD FOR MAKING A CATALYTIC CONVERTER CANISTER

FIELD OF THE INVENTION

This invention relates to a catalytic converter canister member and more particularly, to a catalytic canister member assembly which is adapted to be selectively deployed upon a vehicle and to be operably used within a catalytic converter assembly which receives and treats undesirable emissions emanating from a vehicle engine.

BACKGROUND OF THE INVENTION

A catalytic converter assembly is typically deployed upon a vehicle and is communicatively and physically coupled to the engine, effective to receive and to treat the undesirable engine emissions. The treated emissions are then communicated into the vehicle's exhaust assembly where they are output from the assembly and into the ambient environment in which the vehicle resides. More particularly, the catalytic converter assembly usually resides upon the bottom surface of the vehicle and is connected to the engine and to the vehicle exhaust assembly. Since the catalytic converter assembly resides upon the bottom surface of the vehicle (i.e., the surface of the vehicle which is in close proximity and slightly above the road upon which the vehicle travels), it is highly desirable to form the catalytic converter into an oval, elliptical, or relatively thin or low profile shape or geometric configuration in order to provide a desired amount of clearance between the catalytic converter assembly and the road.

While prior catalytic converter assemblies adequately treat the undesirable engine emissions, they are difficult to manufacture, requiring the selective formation and attachment of many separate and individual portions or members, thereby undesirably increasing the overall vehicle cost and undesirably increasing the likelihood that some of these individual members or portions are defective or "out of tolerance", thereby preventing the overall catalytic converter assembly from properly fitting beneath the vehicle and from properly operating.

Some attempts have been made to simplify the manufacture or formation of a catalytic converter assembly, such as by the use of a single tube or member which has a relatively large diameter. The relatively large diameter tube or member is then selectively reduced or made thinner by a "drawing" or "spinning" process. While this process does produce a catalytic converter assembly which selectively treats undesirable engine emissions, it does not allow a substantially low profile, elliptical, or oval shaped member or assembly to be practically produced, thereby undesirably causing the deployed catalytic converter assembly, especially the relatively large catalytic member containing canisters, to be in relatively close proximity to the road surface and concomitantly increasing the likelihood of damage to the catalytic converter assembly by stones or other debris or objects which are resident upon the road. In order to improve the "road clearance", the catalytic converter assembly must by mounted relatively high within the vehicle, thereby undesirably reducing the amount of mounting space necessary for the other vehicle components. The mounting space requirements of these other vehicle components may even make this alternative catalytic converter mounting arrangement substantially unavailable or unattainable.

Further, the drawing or reduction of the provided member or tube detrimentally impacts or substantially reduces the structural integrity of the tube and of the formed catalytic converter assembly, thereby increasing the likelihood of failure or malfunction of the catalytic converter assembly.

There is therefore a need for a new and improved method for making a catalytic converter assembly which allows a substantially low profile catalytic converter assembly to be produced in a manner which overcomes at least some of the previously delineated drawbacks of prior techniques or methodologies for making catalytic converter assemblies and which further allows for the selective formation of a catalytic converter canister member having an integrally formed flange and which is selectively and relatively easily attachable to a second member or assembly, effective to form an overall low profile catalytic converter assembly.

SUMMARY OF THE INVENTION

It is a first object of the present invention to provide a method or process for producing a catalytic converter assembly which overcomes some or all of the previously delineated drawbacks of prior catalytic converter production methods and processes.

It is a second object of the present invention to provide a method or process for producing a catalytic converter canister member having an integrally formed flange.

It is a third object of the present invention to provide a method or process for producing a catalytic converter assembly which overcomes some or all of the previously delineated drawbacks of prior catalytic converter production methods and processes and which allows for the selective formation of a relatively low profile catalytic converter canister which may be operatively used within a catalytic converter assembly.

It is a fourth object of the present invention to provide a method or process for producing a catalytic converter assembly which overcomes some or all of the previously delineated drawbacks of prior catalytic converter production methods and processes and which allows for the selective formation of a relatively low profile catalytic converter for use upon a vehicle.

According to a first aspect of the invention, a method for making a catalytic converter canister is provided. The method includes the steps of obtaining a generally tubular member; selectively forming a first expanded portion within the member; forming a second expanded portion within the member; and compressing the expanded second portion, effective to form a flange. The method may further include the steps of providing a second catalytic converter canister assembly; and selectively connecting the second catalytic converter canister to the first catalytic converter canister, effective to form a catalytic converter assembly.

These and other features, aspects, and advantages of the present invention will become apparent from a reading of the following detailed description of the preferred embodiment of the invention and by reference to the following drawings.

BRIEF DESCRIPTION OF THE DRAWINGS

FIG. 1 is a side view of a vehicle having a catalytic converter assembly which is made in accordance with the teachings of the preferred embodiment of the invention;

FIG. 5 is a view of the catalytic converter canister which is made in accordance with the process shown in FIGS. 2(a)–(g) and which is taken along view arrow 5—5.

DETAILED DESCRIPTION OF THE PREFERRED EMBODIMENT OF THE INVENTION

Figure 2A:
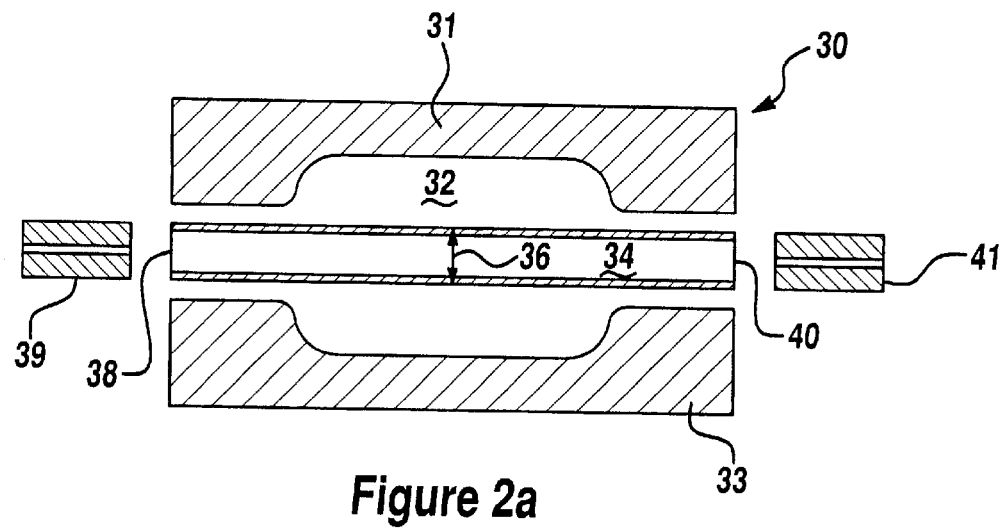
FIGS. 2(a)–(f) are successive diagrammatic views of a catalytic converter canister formation process according to the teachings of the preferred embodiment of the invention.

Referring now to FIG. 1, there is shown a low profile catalytic converter assembly 10 which is made in accordance with the teachings of the preferred embodiment of the invention and which is operatively deployed and secured to the bottom or under surface 12 of a vehicle 14 and which is separated from the road 16 by a relatively large separation or clearance distance 18. As further shown best in FIG. 1, assembly 10 is operatively coupled to and/or attached to the engine 20 and receives the undesirable engine emissions 22. The assembly 10 is further operatively coupled to the exhaust assembly 24. The received undesirable emissions 22 are chemically treated by the contained substrate portions 26, 28 which are respectively resident within canisters 29, 35. The "treated" emissions are communicated to the exhaust assembly 24 and then emitted into the ambient environment in which the vehicle resides.

Referring now to FIGS. 2(a)–(g), there is shown a process 30 for making a single catalytic canister portion or member, such as canister members 29 or 35. Particularly, process 30 begins with the step which is shown in FIG. 2(a) and which requires the acquisition or the creation of an upper die 31 and a lower die 33 which cooperatively form an interior cavity 32 which conforms to the general shape of the desired catalytic converter canister, such as members 29 or 35. Further, a generally elongated and substantially hollow tubular member 34 having a relatively constant diameter 36 is insertably placed within the cavity 32 and a pair of conventional and substantially identical "end punches" 39, 41 selectively enter cavity 32 and are selectively, respectively, and moveably placed in close proximity to each opposed open end 38, 40 of tube 34.

Figure 2B:
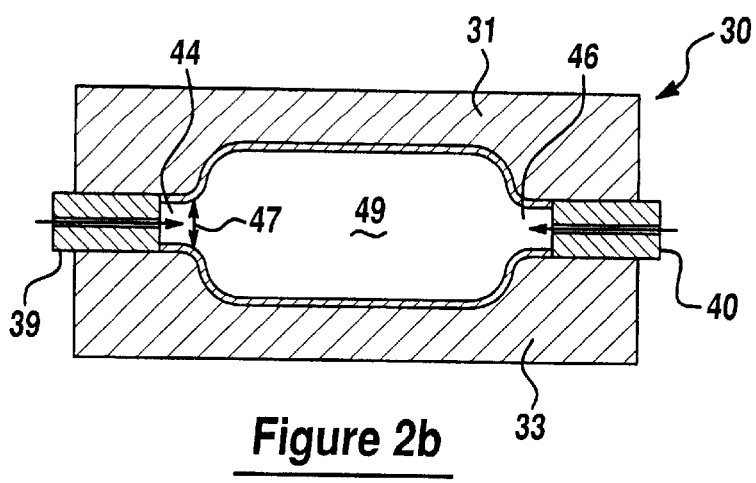

In the second step of process 30, which is best shown in FIG. 2(b), punches 39, 41 selectively enter cavity 32 and respectively press against the respective 38, 40 ends of the member 34, thereby causing the tube 34 to forcibly expand and substantially fill the cavity 32, effective to cause the tube or member 34 to be formed into the shape and geometric configuration of the interior of cavity 32. In other non-limiting embodiments, the tube 34 may be selectively expanded by the use of air, gas, water, or other relatively non-viscous mediums. In the preferred embodiment of the invention, selectively and forcibly expanded tube 34 forms a selectively expanded central portion 49 and substantially identical end portions 44 and 46 which each have a substantially identical diameter 47 which is substantially and respectively equal to the diameter 36 and are hence substantially "unchanged" by the previously delineated expansion process.

Figure 2C:
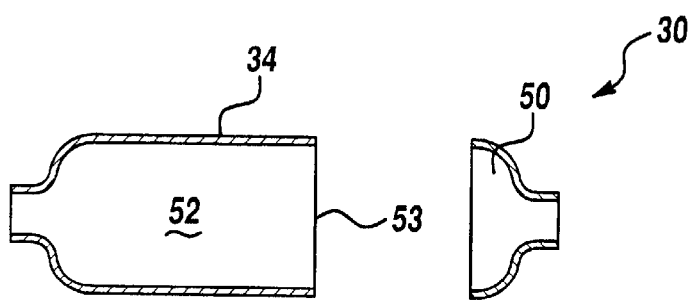

In the third step of process 30, which is shown best in FIG. 2(c), the die portions 31, 33 are retracted (i.e. the dies 31, 33 are "opened"), and the selectively expanded or formed tube 34 is removed from the open die portions 31, 33. End portions 50 is then removed from the formed tube 34 by use of a laser cutting device, thereby forming a portion 52 of the selectively expanded tube 34 having an open end 53.

Figure 2D:
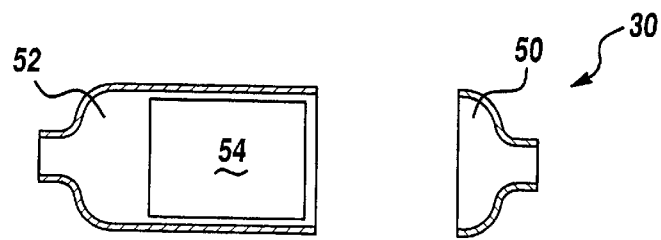

In the fourth step of process 30, which is shown best in FIG. 2(d), a catalytic substrate member 54 is frictionally and insertably placed into portion 52 through the open end 53.

Figure 2E:
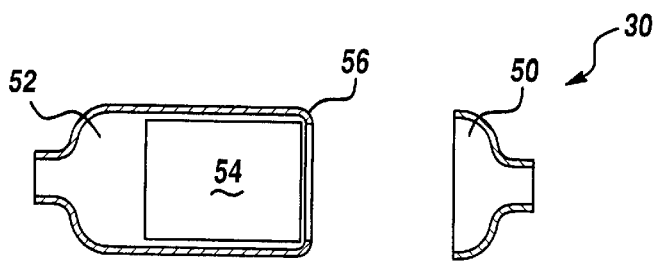

In the fifth step of process 30, which is shown best in FIG. 2(e), the edge 56 of the portion 52 is bent or swaged, thereby preventing the catalytic substrate member 54 from exiting, leaving, or being removed from portion 52.

Figure 2F:
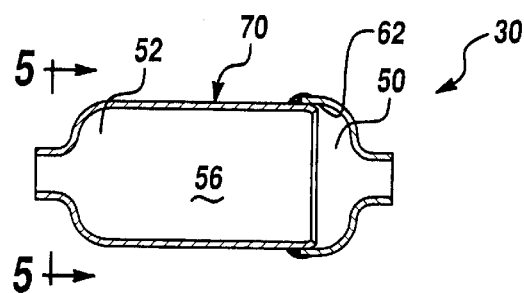

In the sixth step of process 30, as shown best in FIG. 2(f), end portion 50 receives the portion 52, thereby "re-forming" the expanded member 34. Particularly, edge 56 engages the respective undersurface edge 62 of the portion 50 and the edges 56, 62 or welded or otherwise secured in a conventional fashion, thereby creating a catalytic converter canister 72 having a relatively low profile and a substantially oval or elliptical cross sectional area and a substantially oval or elliptical outlet portion 74, which is best shown in FIG. 5.

Referring now to FIGS. 3(a)–(e) there is shown a method or process 70 for forming a catalytic converter canister assembly or member, such as a catalytic converter canister member 29 or 35. As shown best by FIG. 3(a), process 70 begins by acquiring, forming, or otherwise providing a first "upper" die 82, a second "upper" die 84, a first "lower" die 86 and a second "lower" die 88. Particularly, die portions 82 and 86 cooperatively form a first cavity 87 which generally conforms to the shape of a desired catalytic converter canister, and die portions 84 and 88 cooperatively a second die cavity 89 which, as is more fully delineated below, communicates with the cavity 87 and which generally conforms to and/or which provides a substantially "accordion-like" or "rigid" or "pleated" shape. Further, a generally tubular, hollow, and elongated member 96 having a substantially constant diameter 94 is insertably placed within the communicating cavities 87, 89 (i.e., tube 96 is longitudinally coextensive to the communicating die cavity 87, 89). Further, an assembly 85 is provided and includes a pair of substantially similar die members 90, 92 which cooperatively receive or "contain" a pair of substantially identical hole punch ram members 95, 97 and a punch member 98 which is operably contained between the hole punch ram members 95, 97. The punch member 98 is placed in close proximity to end 112 of member 96 and a second punch member 101 is deployed in close proximity to open end 111.

Figure 3A:
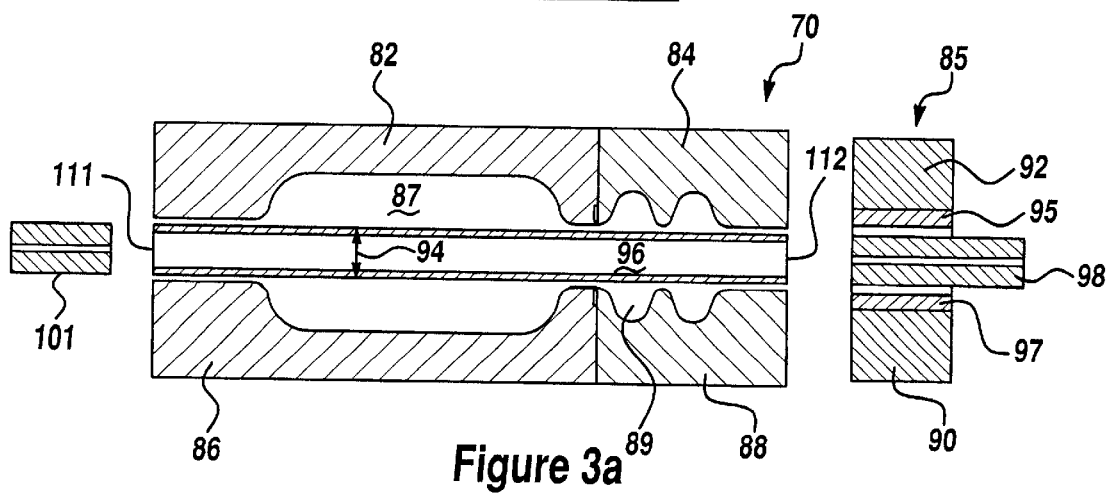
FIGS. 3(a)–(e) are successive diagrammatic views of a catalytic converter canister formation process according to the teachings of a second embodiment of the invention.
Figure 3B:
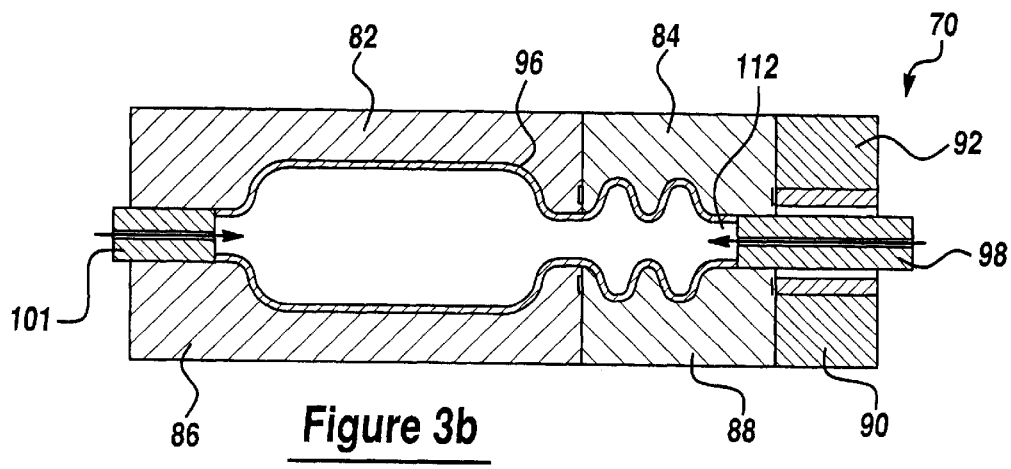

In the second step of process 70, which is shown best in FIG. 3(b), punch members 98, 101 respectively press against the ends 111, 112 of the member 96, thereby expanding the contained member 96 within the communicating die cavities 87, 89 and causing the contained member 96 to substantially and forcibly conform to the shape of the communicating and dissimilar shaped cavities 87, 89.

Figure 3C:
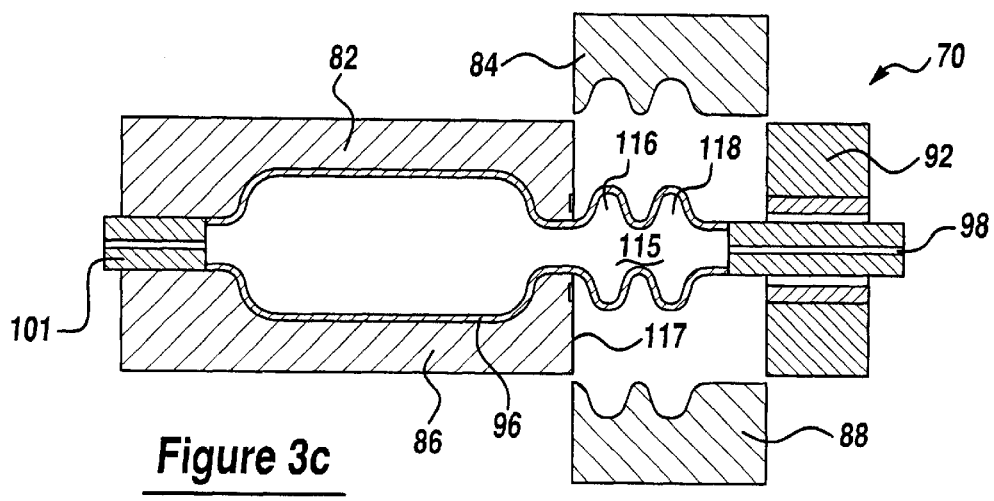

In the third step of process 70, which is shown best in FIG. 3(c), the die portions 84, 88 are opened, thereby exposing the portion 115 of the member 96 which forcibly conforms to the shape of the cavity 89. As shown, portion 115 includes a pair of selectively and forcibly expanded portions 116, 118.

Figure 3D:
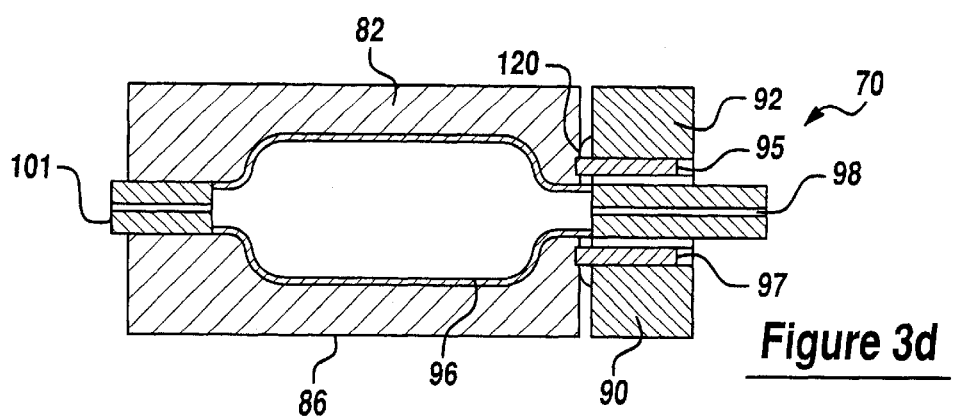
Figure 3E:
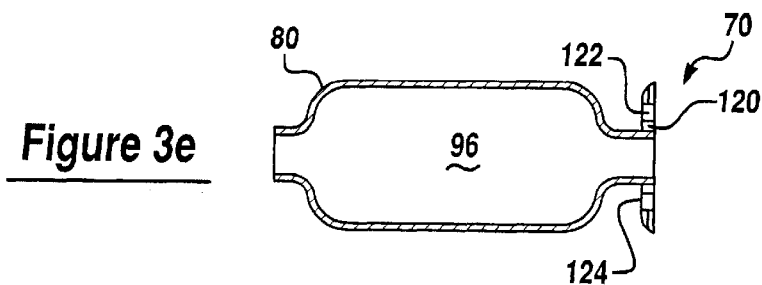

In the fourth step of process 30, which is shown best in FIG. 3(d), the punch 98 and the dies 90, 92 cooperatively and substantially compress portion 115 against the die wall 117, thereby forming a flange or edge 120 which is integrally formed with the selectively expanded member 96 and thereby obviating the need to separately provide and weld or otherwise attach a separate flange member upon the selectively expanded member 96 and allowing a catalytic converter canister having an integrally formed flange to be produced. Punches 95, 97 slidably engage the flange or edge 120, thereby forming apertures 122, 124 through flange portion 120 and creating a catalytic converter canister member 80 which, in a non-limiting embodiment of the invention, may be further processed according to the process steps of process 30 which were previously delineated within FIGS. 2(c)–2(d) above.

Figure 4A:
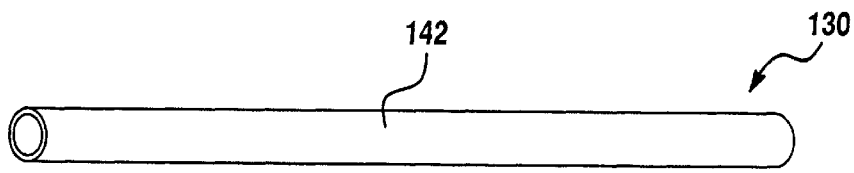
FIGS. 4(a)–(f) are successive diagrammatic views of a catalytic converter canister formation process according to the teachings of a third embodiment of the invention.

Referring now to FIGS. 4(a)–(f), there is shown a process 130 for making a catalytic converter canister assembly according to the teachings of a third embodiment of the present invention. Particularly, process 130 begins with the step which is shown in FIG. 4(a) and which requires the acquisition of a generally tubular, hollow, and elongated member 142 having a relatively constant diameter.

Figure 4B:
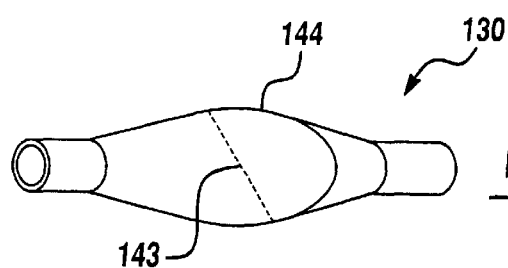
Figure 4C:
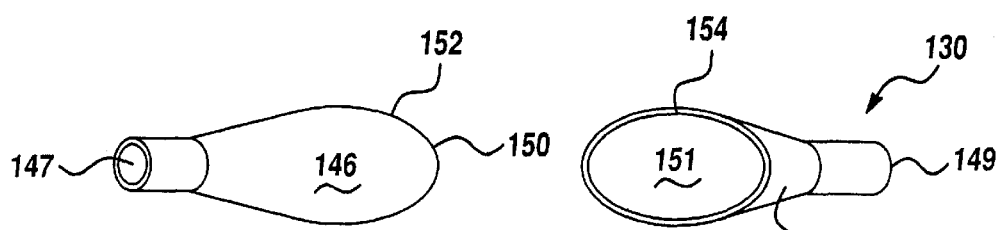

In the second step of process 130, as shown best in FIG. 4(b), member 142 is selectively expanded in a manner which has been previously delineated, such as and without limitation in the manner generally described with respect to FIGS. 2(a) and (b), effective to form a selectively expanded member 144.

In the third step of process 130, as shown best in FIG. 3, an "angled" frusta-conical incision or cut is made within the selectively expanded member 144 and along axis 143, thereby forming a substantially identical pair of substantially hollow member and substantially frustaconical members 146, 148 respectively having a narrow apertures 147, 149 and further having relatively larger apertures 150, 151 which are bounded by respective edges 152, 154.

Figure 4D:
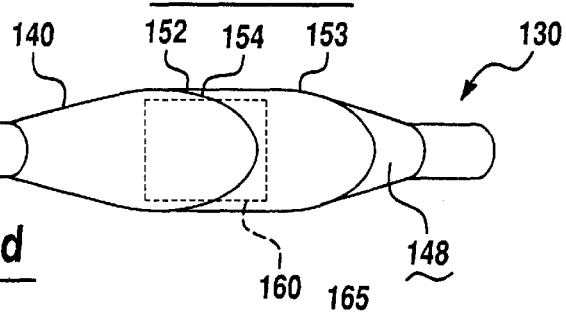

In the fourth step of process 130, as shown best in FIG. 4(d), a catalyst member 160 is inserted into portions 146, 148, through respective openings 150, 151. The portions 146, 148 are then joined along edges 152, 154, thereby forming a catalytic canister assembly 153.

Figure 4E:
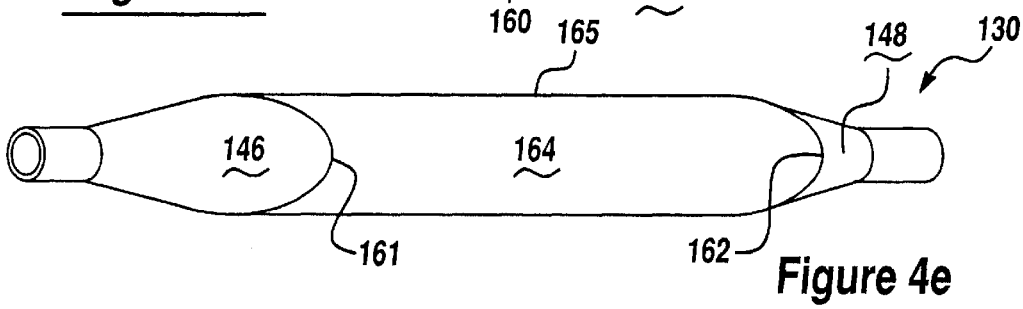

Alternatively, as shown best in FIG. 4(e), in the fourth step of process 130, portions 146 and 148 are selectively connected to opposed open ends 161, 162 of a catalyst containing tube 164, thereby forming a catalytic converter canister assembly 165.

Figure 4F:
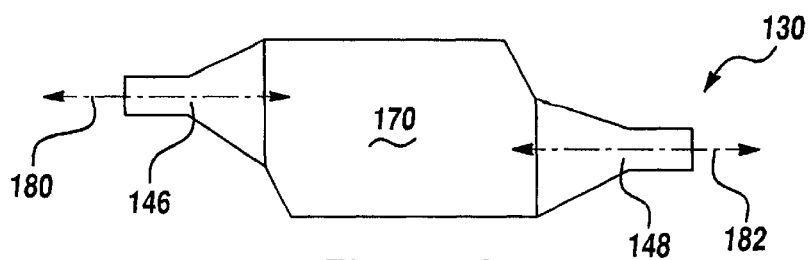

Further, as shown best in FIG. 4(f), portions 146, 148 may be communicatively coupled, in the fourth step of process 130, to a tube or member 170 of any desired shape and size which is required for a particular vehicle configuration. In this non-limiting embodiment, portions 146, 148 may be "offset" (i.e., the respective longitudinal axes of symmetry 180, 182 of portions 146, 148 are not aligned as they were in the catalytic converter canister assembly 165).

It should be appreciated that the foregoing processes 30, 70, and 130 allow for the formation of a relatively low profile catalytic converter canister 72, 80, 153 having a cross sectional area which is substantially similar to that which is shown in FIG. 5, and that these independently created catalytic converter canisters may be selectively and relatively easily attached to various tubes or members having various shapes or geometric configurations, thereby increasing their respective utility within a vehicle.

It is to be understood that the invention is not limited to the exact construction or method which has been previously delineated above, but that various changes and modifications may be made without departing from the spirit and the scope of the invention as set forth in the following claims.

What is claimed is:

1. A method for making a catalytic converter canister comprising the steps of:
   providing a member;
   selectively expanding a first portion of said member;
   removing a certain end portion of said selectively expanded member;
   placing a catalyst member within said selectively expanded member;
   reattaching said removed certain end portion to said selectively expanded member, thereby forming a catalytic converter canister.

2. The method of claim 1 wherein said step of selectively expanding said first portion comprises:
   providing a die;
   placing said member within said die;
   compressing said member, effective to cause said member to expand within said die.

3. The method of claim 2 wherein said step of reattaching said removed certain portion to said selectively expanded member comprises the steps of:
   creating a swaged portion upon an edge of said removed certain portion.

4. A method for making a catalytic converter canister comprising the steps of:
   providing a member;
   selectively expanding a first portion of said member;
   selectively expanding a second portion of said member;
   compressing said selectively expanded second portion of said member, effective to form a flange.

5. The method of claim 4 wherein said step of selectively expanding said first portion of said member comprises:
   providing a die;
   placing said member within said die; and
   compressing said member, effective to selectively expand said first portion.

6. The method of claim 5 wherein said step of selectively expanding said second portion of said member comprises compressing said member, effective to selectively expand said second portion.

7. The method of claim 6 wherein said first and said second portions have respectively dissimilar shapes.

8. The method of claim 7 wherein said selectively expanded second portion has a substantially pleated shape.

9. The method of claim 5 further comprising the step of creating at least one aperture within said flange.

10. The method of claim 4 wherein said selectively expanded first portion has an elliptically shaped cross sectional area.

11. The method of claim 4 wherein said selectively expanded first portion has a substantially oval cross sectional area.

12. A method for making a catalytic converter canister comprising the steps of:
   providing a member;
   selectively expanding a portion of said provided member;
   forming first and second frusta conical members by use of said selectively expanded member;
   providing a second member; and
   attaching said first and said second frusta conical member to said second member.

13. The method of claim 12 wherein said first and second frusta conical members are aligned upon said second member.

14. The method of claim 12 wherein said first and second frusta conical members are offset when deployed upon said second member.

15. The method of claim 12 further comprising the step of placing a catalyst member within each of said first and second frusta conical members.

16. The method of claim 12 wherein said provided member is expanded by use of a compression force.

17. The method of claim 12 wherein said first and second frusta conical members are formed by the process of cutting said selectively expanded provided member.

* * * * *